(12) United States Patent
Frieden

(10) Patent No.: US 9,242,698 B2
(45) Date of Patent: Jan. 26, 2016

(54) ELECTRIC DRIVE FOR BICYCLES

(71) Applicant: Peter Frieden, Cologne (DE)

(72) Inventor: Peter Frieden, Cologne (DE)

(73) Assignee: VELOGICAL engineering GmbH, Cologne (DE)

(*) Notice: Subject to any disclaimer, the term of this patent is extended or adjusted under 35 U.S.C. 154(b) by 0 days.

(21) Appl. No.: 14/384,601

(22) PCT Filed: Mar. 25, 2013

(86) PCT No.: PCT/EP2013/000889
§ 371 (c)(1),
(2) Date: Sep. 11, 2014

(87) PCT Pub. No.: WO2013/149708
PCT Pub. Date: Oct. 10, 2013

(65) Prior Publication Data
US 2015/0041234 A1 Feb. 12, 2015

(30) Foreign Application Priority Data

Apr. 3, 2012 (DE) .......................... 10 2012 006 830

(51) Int. Cl.
*B62M 13/04* (2006.01)
*B62M 7/12* (2006.01)
*B62M 6/75* (2010.01)

(52) U.S. Cl.
CPC ................. *B62M 13/04* (2013.01); *B62M 6/75* (2013.01); *B62M 7/12* (2013.01)

(58) Field of Classification Search
CPC ........... B62M 6/75; B62M 7/12; B62M 13/04
USPC ...................................................... 180/206.8
See application file for complete search history.

(56) References Cited

U.S. PATENT DOCUMENTS

| | | | | |
|---|---|---|---|---|
| 2,586,082 A * | 2/1952 | Piatti | | 180/221 |
| 3,339,659 A * | 9/1967 | Wolf | | 180/221 |
| 3,374,534 A * | 3/1968 | Kuska et al. | | 29/605 |
| 3,646,374 A * | 2/1972 | Jordan et al. | | 310/45 |
| 3,915,250 A * | 10/1975 | Laden et al. | | 180/220 |
| 4,175,629 A * | 11/1979 | Kalajzich | | 180/220 |
| 4,579,188 A * | 4/1986 | Facer | | 180/211 |
| 4,742,257 A * | 5/1988 | Carpenter | | 310/62 |
| 5,078,227 A | 1/1992 | Becker | | |
| 5,397,837 A * | 3/1995 | Arjunan | | 525/72 |
| 5,735,363 A * | 4/1998 | Horovitz et al. | | 180/206.8 |
| 6,100,615 A * | 8/2000 | Birkestrand | | 310/75 C |
| 7,040,443 B1* | 5/2006 | Roth et al. | | 180/221 |
| 2009/0230791 A1* | 9/2009 | Scharfenberg et al. | | 310/62 |
| 2011/0232985 A1 | 9/2011 | Lee | | |
| 2013/0225360 A1* | 8/2013 | Hirn | | 476/11 |

FOREIGN PATENT DOCUMENTS

| | | |
|---|---|---|
| DE | 3523993 U | 3/1986 |
| DE | 4219763 A | 12/1993 |
| DE | 19633345 A | 2/1998 |
| DE | 29922683 U | 4/2000 |
| DE | 102009053973 A | 6/2011 |
| JP | 2002029485 A | 1/2002 |

* cited by examiner

*Primary Examiner* — Joseph Rocca
*Assistant Examiner* — Michael Stabley
(74) *Attorney, Agent, or Firm* — Andrew Wilford

(57) ABSTRACT

The invention relates to an electric drive for bicycles, comprising two symmetrically arranged external-rotor type counter-rotating motors which are fed via two separate motor actuators/regulators that obtain the same control signal for power regulation purposes. The motors are mounted in an oscillating manner about an axis which is parallel, in particular substantially parallel, to the motor axis but offset with respect to the motor axis in a lateral manner, in particular in a parallel manner.

16 Claims, 3 Drawing Sheets

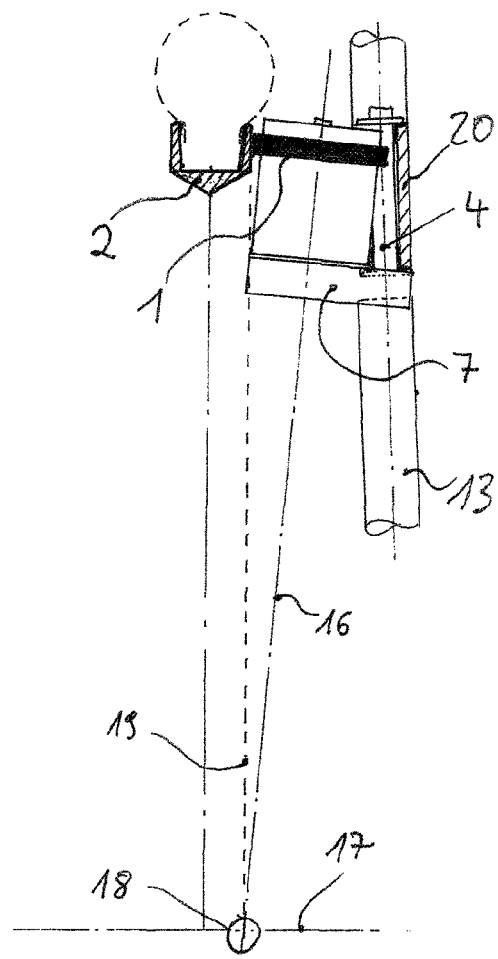
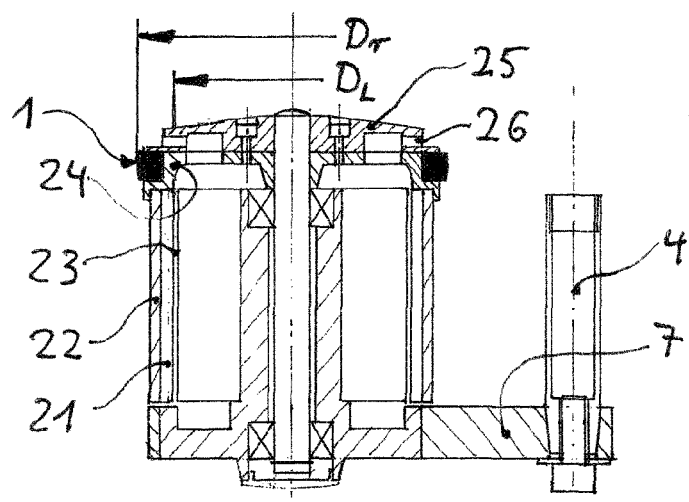

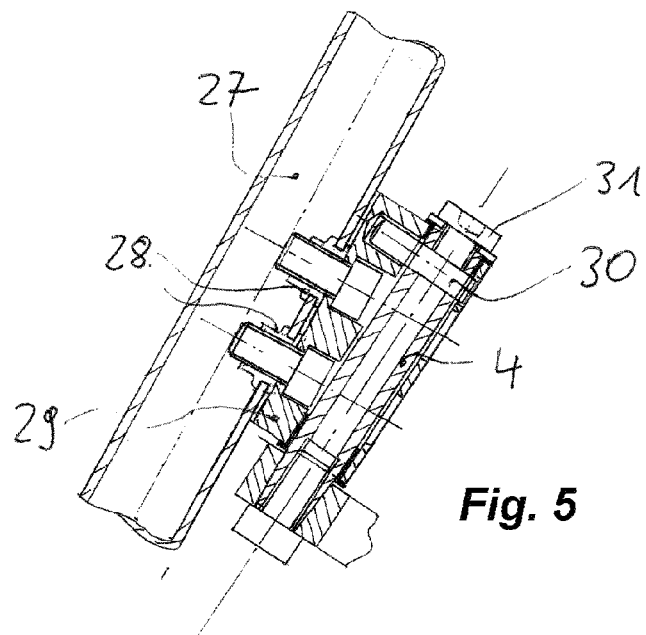
Fig. 5
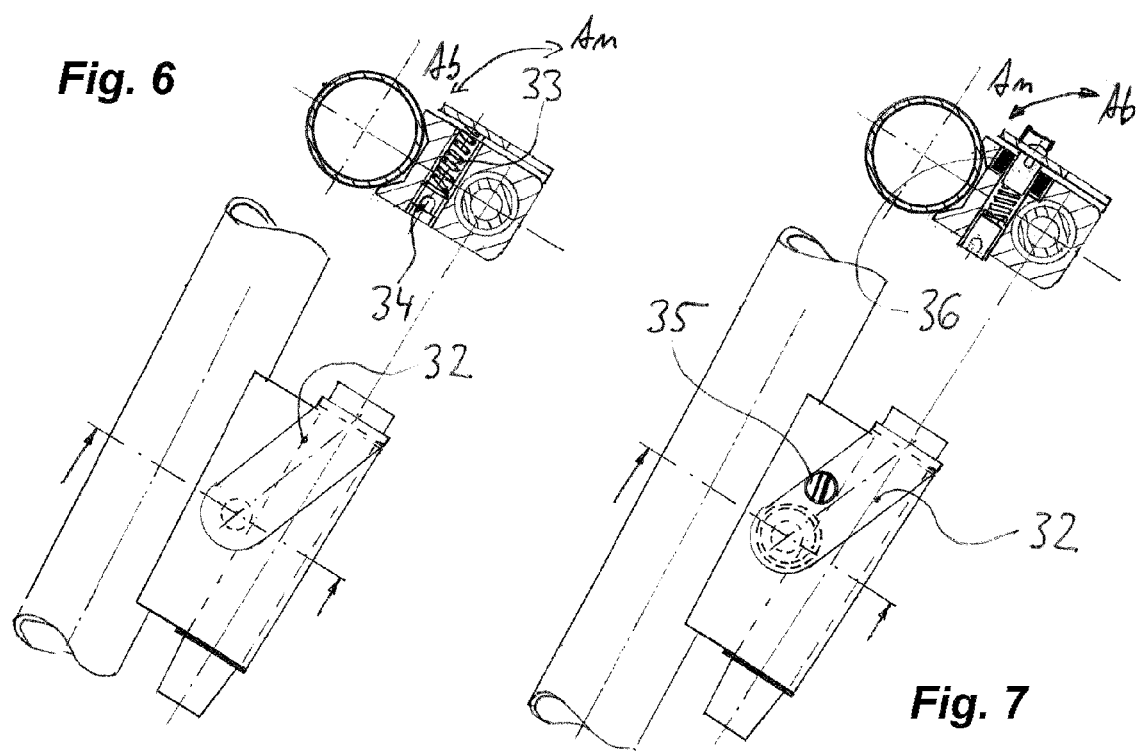
Fig. 6
Fig. 7

ELECTRIC DRIVE FOR BICYCLES

CROSS REFERENCE TO RELATED APPLICATIONS

This application is the US-national stage of PCT application PCT/EP2013/000889 filed 25 Mar. 2013 and claiming the priority of German patent application 102012006830.1 itself filed 3 Apr. 2012.

FIELD OF THE INVENTION

The invention relates to an electric drive for a bicycle with two symmetrically arranged, counter-rotating motors of the external rotor (outrunner) type that are fed by two separate motor controllers/governors that receive the same control signal for regulating the output.

BACKGROUND OF THE INVENTION

The hub motors that are mostly used at present only rotate at the speed of the wheel, approx. 200 rpm at 25 km/h, and have to generate extremely high torque in order to produce a sufficient forward thrust at the outer circumference of the wheel. The material input, the weight and the costs of this design are correspondingly large. One additional disadvantage is that the considerable motor weight of approx. 3 kg contributes 100% to the unsprung mass and adversely affects the driving characteristics of spring-mounted wheels. Front-wheel motors can easily spin on a slippery road surface, resulting in a risk of crashing. Rear-wheel motors inhibit the installation of disc brakes as well as derailleur and hub gears.

Centrally mounted motors avoid these disadvantages because they are usually fitted directly behind the bottom bracket, have a highly reduced transmission ratio and transfer their power to the chain via a sprocket. However, the service intervals of these highly strained wearing parts are additionally shortened by the motor. Power flow is complicated and subject to high loss because the output of the high-revving motor first has to be transferred to the very low chain speed and from there reconverted to the high peripheral speed of the wheel. Mounting space and fastening of the motor have to be taken into account during the frame design, eliminating the possibility of retrospective installation.

One special variation of the centrally mounted motor circumvents this restriction because in this case the motor sits concentrically on the axis of the bottom bracket occupies the design space of the front sprocket and needs only one torque support on the frame. Consequently, it can be retrofitted without difficulty on many bicycles. However, compared with the hub motor, its weight problem is further aggravated. As it can only rotate at the pedaling frequency, 60 to 80 rpm, it has to generate almost three times as much torque.

Apart from the legendary VeloSolex with petrol engine, which has been successfully marketed in substantial quantities, four other applications are known from the patent literature that closely resemble the invention described here because they also pursue the aim of directly driving the wheel at its outer circumference by frictional contact from lightweight and high-revving motors. In physical terms, this path definitely makes sense because the performance capacity of electric motors increases proportionally with the rotational speed and, due to the high peripheral speed, a given output can be transferred with correspondingly smaller forces.

US 2011/0232985 most closely approximates the Solex because the motor, which is parallel to the axle, transfers its angular force directly to the tread of the rear tire.

OE 42 19 763 and OE 196 33 345 have a single motor positioned outside of or above the tire and drives both sides of the tire flanks via a transmission that also simultaneously receives the torque division on two friction rollers.

DE 690 31 993 [U.S. Pat. No. 5,078,227] does not need a transmission because here there are two counter-rotating motors also mounted outside/above the front tire and the friction rollers are located on the motor axles that extend downward.

Various arrangements of motor mount and levers enable the friction rollers to be actively moved into their operating position with a high contact pressure onto the tire or into a contact-free idling position.

OBJECT OF THE INVENTION

The object of this invention is to provide an extremely lightweight and economical electric drive for a bicycle that, due to its low number of moving parts and short functional chain, is especially robust and low on maintenance. The intention is to achieve a high operational range through high efficiencies of motor and transmission combined with minimal drag losses despite the low battery weight. Propulsion is to be possible via front, rear and both wheels simultaneously with no restrictions in terms of derailleur or hub gears and brakes. In addition to the retrofitting capacity on as many cycle types as possible there is a particular concern to retain the original bicycle character as far as possible despite the electric drive, which apart from the motor being optically inconspicuous also means that it should still be possible to transport the cycle in cars and trains without difficulty and to carry it over steps and stairs.

SUMMARY OF THE INVENTION

This object is attained by the device embodying the invention having an annular groove or recess for accommodating an elastic frictional ring located at or on the rotating cylinder surface of the motors to transmit the propulsive output by frictional contact onto the wheel rim and especially by the motors being mounted to swing about an axis that is essentially parallel to the motor axis, where the former axis is, however, laterally offset and, in particular, parallel to the motor axis.

The bicycle drive of this invention differs from the familiar designs in that the motor(s) is (are) mounted radially within the circumference of the tire and power transmission does not take place onto the tire but, instead, onto the flank of the wheel rim.

In contrast to the tire, which due to inaccuracies in production and mounting may simultaneously exhibit gross deviations in shape within one revolution of the wheel, the rim has an ideally machined surface that at the most exhibits small lateral movements per revolution of the wheel due to buckling. Consequently, the friction ring can roll much more evenly and smoothly on the flank of the rim than on the surface of the tire.

As long as the wheel remains in motion, the tire bead acts as a dirt repellent and keeps the rim almost perfectly clean, which favors the defined frictional conditions. In contrast, due to its direct contact with the road surface, the tire always has a dirty or greasy film to a greater or lesser extent that only greatly increased contact pressure can compensate for, at the cost of increased flexing work and lower efficiency.

In addition to the aspect of optical inconspicuousness, the arrangement of the motor radially inward of the tire has the advantage that no conflict exists with mudguards or luggage racks. As the radial transmission forces of the friction ring are guided into the upper motor bearing via the shortest path, there are no angular shaft bending moments as in the above prior-art systems that makes it possible to achieve a design that is especially economical on material and weight.

The invention relates to an electrical drive for a bicycle in which two external rotor motors located at opposite positions transfer angular force to the rim of the bicycle wheel through an elastic ring. The contact pressure necessary for this is generated by the motors themselves, because the movable mounting of the motors is selected in such a way that the angular force and contact pressure are always in a geometrically determined, fixed ratio.

BRIEF DESCRIPTION OF THE DRAWING

Sample designs of the invention are shown in the drawings and are described in greater detail below. In the drawing:

FIG. 3 is a partial view of a drive on the rear wheel, FIG. 4 is a section through the drive, FIG. 5 shows an installation with retrofitting of the drive, FIG. 6 a partial view for the rear-wheel drive, FIG. 7 a partial view like FIG. 6 with an additional lifting magnet.

SPECIFIC DESCRIPTION OF THE INVENTION

Figure 1:
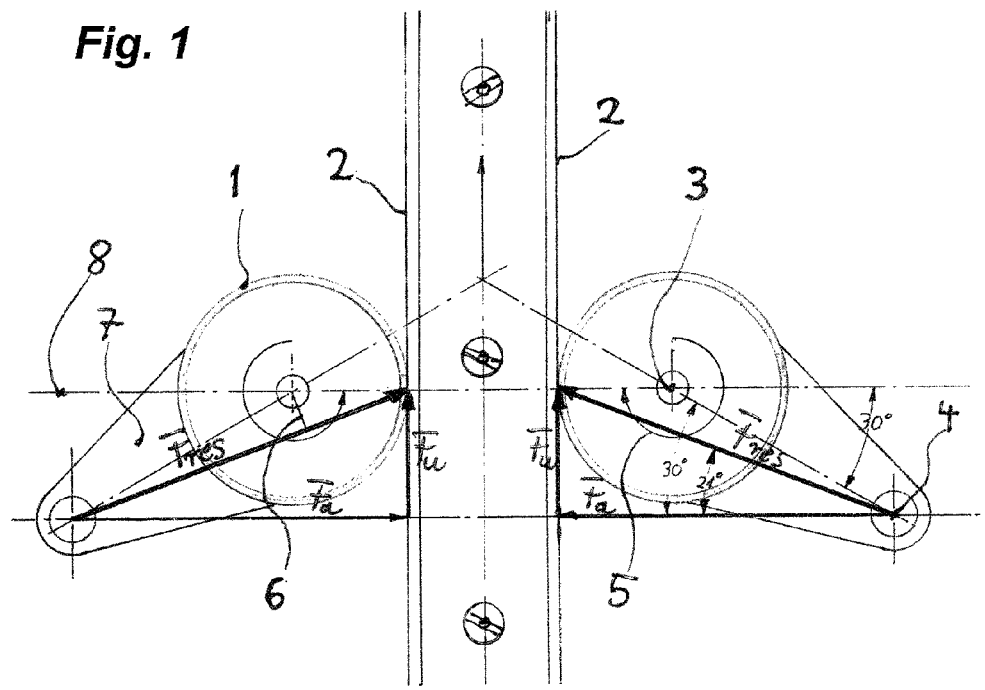
FIG. 1 is a view from above onto the drive on the front wheel.

FIG. 1 shows the drive on the front wheel, seen from above and without a tire, with the principal operating mode being clear: a respective elastic friction ring 1 rolls on each flank of the rim 2 on which it exerts a resulting force, $F_{res}$. The latter can be resolved into a contact force $F_a$ and a angular force $F_u$ that generates the desired forward thrust. Thanks to a symmetrical arrangement and opposite directions 5 of rotation, the contact forces cancel each other out and the forward thrust forces combine. Compared with the above-mentioned state of the art, this drive has the additional distinctive feature that each motor produces the contact pressure itself through its torque, because the reaction force Fres with its lateral spacing (lever arm 6) from a motor axis 3 always forms a counter moment of equal magnitude to the motor moment. Due to the contact point on the rim 2 and due to the swing axis 4 of which the motor support 7 is mounted with little friction, the position of the force vector is fixed once and for all so that although angular and contact forces may vary according to the motor output, they are always in a fixed ratio to one another.

As the rolling friction and hence also the transmission losses increase with rising contact pressure, the latter should only be as large as necessary and as small as possible. Transfer of the highest possible efficiency without any slip and wear is then guaranteed if the quotient $F_u/F_a$ is somewhat smaller than the smallest coefficient of friction to be expected.

In the selected example, the tilt angle a between the wheel axle 8 and a connecting line between the motor axle and the swing axis has a value of 30° that produces a wedge angle 3 of 21° with a force ratio of $F_u/F_a=\tan 21°=0.38$. Consequently, a contact pair or surface treatment of the rim flank is selected such that the coefficient of static friction never falls below 0.4.

Alternatively, the tilt angle a can be somewhat reduced. From FIG. 1 it becomes clear that excessively large deviations from 30° do not make sense because if the angle a is increased substantially, the limits of grip are quickly reached. If it is reduced excessively, the lever arm 6 becomes shorter and the motor can build up uncontrollably high forces.

In addition to the automatic optimization of efficiency, a further advantage of this drive lies in the fact that no rolling friction is generated when the motor is switched off and the idling friction of a rotating motor is also avoided because, according to the invention, the stationary motor is repelled by the rotating rim. This mounting therefore has an automatic coasting function.

Renewed start-up also functions automatically as the inertia of the accelerating rotor when not under load causes the motor mount to twist toward the rim. As soon as a contact exists there, the motor is jammed against the rim due to the higher peripheral speed when idling. Since the speed governors synchronize the motors, each motor needs its own controller.

A stop (not shown) ensures that the motor can only rise 2 mm from the rim. In a similar manner to rim brakes, this air gap is sufficient for contact-free idling and the travel limitation prevents the motor from flapping about and rebounding with too much momentum during start-up.

Figure 2:
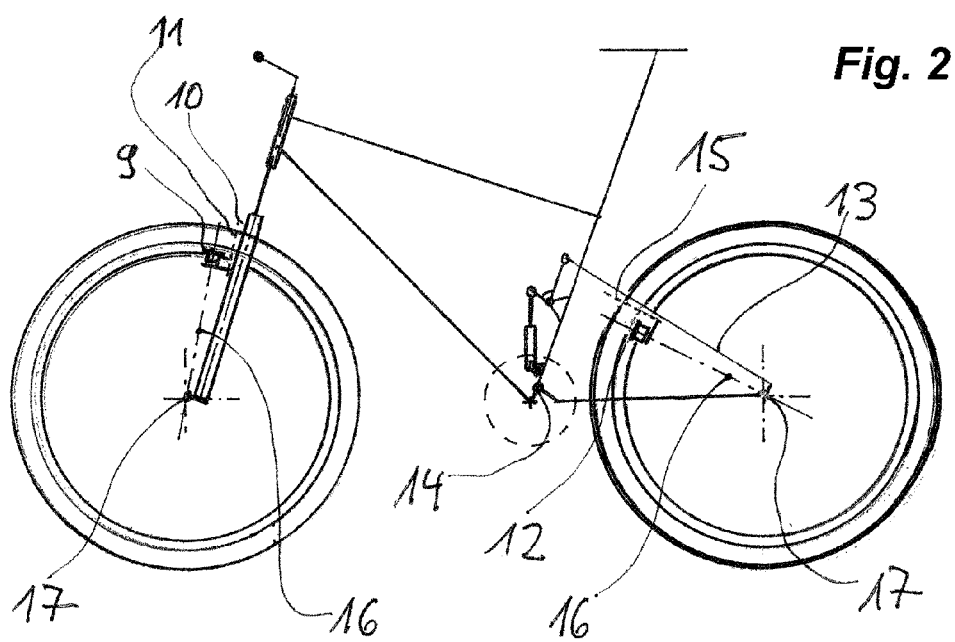
FIG. 2 is a side view of a bicycle with drives on the front and rear wheels.

FIG. 2 shows the situations with motors mounted on the fully sprung front and rear wheels. In the case of front-wheel drive the motors 9 are mounted in front of the forks or fork slider 10 of the suspension fork. For this purpose, a disk brake is proposed because the space customarily used for mounting a rim brake is taken up by the motors. The unsprung mass rises by the motor weight of approx. 500 g that, however, has hardly any effect in practice.

As the swing axis 11 is nearly vertical, almost no weight moments act on the motor mount so that the motors fold onto and away from the rims in a particularly simple and reliable manner without any additional measures.

This version is also advantageous because complete installation kits can be produced in which the motor 9, its mount, the elastic friction ring and the rim surface are perfectly matched to one another in terms of geometry and material selection.

In the case of rear-wheel drive, the motors 12 are located below the diagonally rising seat stays or rear forks 13. As rim brakes are usually mounted above these stays, there are no restrictions relative to other components and retrofitting is possible for many cycle types.

Another advantage is that the spacing of the motors 12 from the pivot point 14 of the rear wheel rocker aim is only half as great as the hub spacing so that the unsprung mass increases by only one half of the motor weight, hence by approx. 250 g.

As the swing axes 15 here are very sharply inclined, the weight of the motor has to be neutralized by a spring so that the motors fold reliably into place when accelerating and the friction rings are positioned against the rim.

Of course, the motor axes 16 have to intersect the wheel axes 17 because, otherwise, relative movement will occur in the contact zone which increases friction and wear.

FIG. 3 shows the rear-wheel drive from diagonally below in the longitudinal direction. As the rim 2 has a slightly higher peripheral speed at the upper edge than at the lower edge, optimum transmission without any relative motion in the contact zone cannot occur unless the motor axis 16 intersects the wheel axis 17 in the plane 19 of the rim flank.

Over time, the ring wears itself into the surface of the rim and assumes a slightly conical external contour as a result.

As can be seen without much difficulty, the opposing inclinations of motor axis 16 and rear forks 13 have to be adapted in terms of design, which has taken place here inside the motor support 7. Compensation is also possible within the support block 20 that then has to have a mount hole that is inclined relative to the axis of the stay.

The support block 20 may be cemented, soldered or welded, and in the case of retrofitting fastened with screws, clips or threaded brackets. A corresponding lug can be provided on the fork sliders of suspension forks to accommodate the drilled hole.

FIG. 4 shows a section through the motor 12 with motor support 7 and swing axis 4. The motor is a modern brushless external rotor or outrunner motor. Thanks to the flat high-performance magnets 21 that are located internally on the magnetic feedback ring 22, the air gap 23 is positioned so far on the outside that this design is able to generate extremely high torque. In order for the torque to be transferred to the rim as the greatest possible tangential force, the contact diameter Dr of the elastic friction ring 1 should exceed the diameter DL of the air gap 23 by the smallest extent possible. In terms of design, this is realized by having the position of the ring 1 above the magnets 21. The ring 1 has a smaller diameter than its seat on the ring carrier 24 so that it is radially pretensioned during installation. It can also be axially tensioned by the screw connection of the motor cap 25. The cap should contain drilled radial holes for ventilation 26, a feature which forces a stream of cooling air through the motor.

The drive should withstand travel in the rain and spraying with a high-pressure cleaner without damage, which is why electrical components have a waterproof encapsulation. In the motors 9 and 12 complete encapsulation is neither useful nor necessary because the only component really sensitive to water are the ball bearings that require special protection against spray and moisture, for example by seal lips. The stator packet and winding should be sealed/impregnated with a temperature-resistant lacquer; the remaining parts of the motor are in any case protected against corrosion.

FIG. 5 shows one option of how the mount of the swing axis 4 is retrofitted to a frame tube 27. The support block 29 is fastened to the tube with two rivet nuts 28. A noticeable feature is the rotation stop within the support block that prevents the motor from moving more than approx. 2 mm from the rim. It is formed by a pin 30 held by a lateral hole drilled in the swing axis 4 and secured with a screw 31. The freedom of rotation of only a few degrees results from the difference in diameters between the drilled hole and the pin.

FIG. 6 shows a stop 32 positioned on the outside which is formed by an extended packing piece bent through 90°. This version contains a weight compensator for a diagonally suspended motor for rear-wheel drive. The helical compression spring 33 is adjusted by the set screw 34 and functions in the direction of the operating position of the drive but is only pretensioned as far as is necessary to neutralize the weight.

FIG. 7: In addition to a modified stop (stop screw 35), a lifting magnet 36 is also installed in this support block, which is intended to actively assist the fold-on effect when the motor is started up, as described at the outset. Here the directions of rotation are reversed, because when current flows, the motor should be drawn into the contact/working position, and when the motor is switched off, the lifting magnet 36 should drop as well, with the packing piece 32 being pressed against the stop screw 35. Depending on the mounting position (vertical or suspended), the spring may be designed with either a pulling or pushing effect. This version may be necessary in the case of slow vehicles in which the dynamics of motor acceleration are insufficient or in the case of applications under extreme conditions (for example offroad with increase occurrence of dirt).

In the case of very small and particularly rigid wheels, as is the case for folding bikes or children's bikes, one conceivable option is to use the motor in a similar manner with only one motor, with the contact pressure $F_a$ then acting fully on the structure of the wheel.

In the case of 26-inch to 28-inch wheels, the solution with twin motors is definitely preferable, with one special feature: in dynamo mode, only one motor is perfectly sufficient, which is permanently pressed against the rim with moderate spring tension. The entrained motor then functions as a synchronous generator and an alternating voltage is tapped at two of the three motor connections. It is also possible to activate the motor function in this operating mode because it is of secondary importance whether the voltage comes from the motor or the motor controller. It is only necessary to ensure by means of electronic circuitry that no inadmissible voltage peaks destroy the headlight. The advantage lies in the fact that such a lighting system functions with and without a battery, and if it is considered that this measure enables a hub dynamo (which in fact also usually weighs about 400 g) to be completely eliminated, the drive embodied in this invention is even practically neutral in terms of its weight.

Two external rotor motors (outrunners) swing-mounted in symmetrically opposite positions transfer their mechanical output directly onto the rim via an elastic ring. The pivot point of the motor mount is selected so that the necessary contact pressure is in a fixed ratio to the forward thrust produced by the motor. Due to the rotational speed, which is sixteen times higher than hub motors, the motors can be produced extremely easily and economically. When switched off, they do not cause any friction because they then lift off from the flank of the rim.

The invention claimed is:

1. A drive for a bicycle adapted to move in a travel direction and having a frame and a wheel rotatable about a wheel axis on the frame and having a rim and a tire on the rim, the drive comprising:
   two symmetrically arranged counter-rotating motors flanking the wheel and each having an external rotor that rotates an elastic friction ring engageable with a respective flank of the rim about a respective motor axis;
   respective mounts secured to the frame and each carrying a respective one of the motors for pivoting of the motors about swing axes spaced rearwardly in the direction from and generally parallel to the respective motor axes, each motor axis and the respective swing axis forming a plane extending at an angle of less than 45° to the wheel axis such that the ring presses against the rim with a force $F_a$ greater than a transmitted force $F_u$.

2. The bicycle drive defined in claim 1, wherein the mounts and motors symmetrically flank the wheel.

3. The bicycle drive defined in claim 1, wherein each motor axis intersects the wheel axis and each rim flank is frustoconical and centered on the respective wheel axis.

4. The bicycle drive defined in claim 1, wherein the motors are between the rim and the wheel axis.

5. The electric drive according to claim 1, wherein the external rotor of each motor is formed with an annular groove or recess for accommodating the respective elastic friction ring under tension.

6. The electric drive for a bicycle according to claim 1, further comprising:
   a respective stop on the frame limiting a maximum possible spacing between each elastic friction ring and the rim in an idling position.

7. The electric drive for a bicycle according to claim 1, wherein each external rotor is provided with radial air channels that generate a stream of cooling air through the respective motor as a result of centrifugal action.

8. The electric drive for a bicycle according to claim 1, wherein each motor has:
a winding and stator packet impregnated or coated with a temperature-resistant plastic resin or lacquer, and encapsulated ball bearings, each elastic ring consisting of material resistant to abrasion, ozone and UV light.

9. The electric drive for a bicycle according to claim 1, further comprising:
a flexible fastening system for retrofitting on different bicycle types, with an exact tangential alignment of the rotors being adjustable.

10. The electric drive for a bicycle according to claim 1, wherein the swing axes are fixed relative to the forks or, in the case of a rear-wheel drive, in the seat or chain stays.

11. The electrical drive for a bicycle according to claim 1, wherein each motor has a housing and a stiff, one-sided, asymmetrical motor support as an extension arm to accommodate the swing axis and that is equipped with cooling fins and/or a one-piece die-cast part.

12. The electric drive according to claim 1, wherein a coefficient of friction between each elastic ring and the rim is raised by the surface treatments or surface coatings of the respective rim flank in order to achieve a reduction of a contact pressure and an increase in a tilt/wedge angle.

13. The electric drive for a bicycle according to claim 1, further comprising:
a respective adjustable spring element for raising or balancing out a weight of each of the motors, when mounted on a rear wheel with a diagonal axis of swing.

14. The electric drive for a bicycle according to claim 1, further comprising:
a respective electromagnet for augmenting a swinging motion of each of the motors from an idling position into a working position and for increasing a contact pressure of the motor onto the rim.

15. The electric drive for a bicycle according to claim 1, further comprising:
a rechargeable battery or holder therefor fastened to the frame.

16. The electric drive for a bicycle according to claim 1, wherein one of the two motors can be adjusted by spring tension and works permanently or intermittently as a dynamo.

* * * * *